United States Patent
Mirbach et al.

(10) Patent No.: US 8,346,684 B2
(45) Date of Patent: Jan. 1, 2013

(54) PATTERN CLASSIFICATION METHOD

(75) Inventors: Bruno Mirbach, Konz (DE); Pandu Devarakota, AndhraPradesh (IN)

(73) Assignee: IEE International Electronics & Engineering S.A., Luxembourg (LU)

( * ) Notice: Subject to any disclaimer, the term of this patent is extended or adjusted under 35 U.S.C. 154(b) by 862 days.

(21) Appl. No.: 12/374,076

(22) PCT Filed: Jul. 17, 2007

(86) PCT No.: PCT/EP2007/057374
§ 371 (c)(1),
(2), (4) Date: Jun. 23, 2009

(87) PCT Pub. No.: WO2008/012241
PCT Pub. Date: Jan. 31, 2008

(65) Prior Publication Data
US 2009/0319451 A1    Dec. 24, 2009

(30) Foreign Application Priority Data
Jul. 28, 2006  (EP) ..................................... 06118110

(51) Int. Cl.
*G06F 15/18* (2006.01)
(52) U.S. Cl. ......................................................... 706/12
(58) Field of Classification Search ..................... 706/12
See application file for complete search history.

(56) References Cited

U.S. PATENT DOCUMENTS

| | | | | |
|---|---|---|---|---|
| 6,137,911 A | * | 10/2000 | Zhilyaev | 382/225 |
| 2003/0209893 A1 | * | 11/2003 | Breed et al. | 280/735 |
| 2006/0002609 A1 | * | 1/2006 | Casadei | 382/226 |

OTHER PUBLICATIONS

Feature representation and discrillination b:lsed on Gaussian nuxture model probability densities—Practices and algorithms Pekka Paalanen, Joni-Kristian Kamarainen*, Jarmo Hollen, Heikki Kalviainen.*

Paalanen et al., "Feature representation and discrimination based on Gaussian mixture model probability densities—Practices and algorithms", Pattern Recognition, Elsevier, Kidlington, GB, vol. 39, No. 7, Jul. 2006, pp. 1346-1358, XP005403205.

Chee Peng Lim, et al., "Application of the Gaussian mixture model to drug dissolution profiles prediction", Neutral Computing & Applications Springer-Verlag, UK, vol. 14, No. 4, Oct. 2005, pp. 345-352, XP002413035.

International Search Report PCT/EP2007/057374; Dated Sep. 27, 2007.

* cited by examiner

*Primary Examiner* — Kakali Chaki
*Assistant Examiner* — Ababacar Seck
(74) *Attorney, Agent, or Firm* — Cantor Colburn LLP

(57) ABSTRACT

For assigning a test pattern to a class chosen from a predefined set of classes, the class membership probability for the test pattern is calculated as well as the confidence interval for the class membership probability based upon a number of training patterns in a neighborhood of the test pattern in the feature space. The number of training patterns in the neighborhood of the test pattern is obtained from computing a convolution of a density function of the training patterns with a Gaussian smoothing function centered on the test pattern, where the density function of the training patterns is represented as a mixture of Gaussian functions. The convolution of the smoothing function and the mixture of Gaussian functions can be expressed analytically.

12 Claims, 3 Drawing Sheets

PATTERN CLASSIFICATION METHOD

TECHNICAL FIELD OF THE INVENTION

The present invention generally relates to a method of pattern classification or a system implementing such a method.

BACKGROUND OF THE INVENTION

Pattern classification is well known in a number of real-world applications, such as, for instance, speech recognition, vehicle seat occupant classification, data mining, risk prediction, diagnosis classification, etc. The primary goal of a pattern classifier is to assign a test pattern to one or more classes of a predefined set of classes. The test pattern may be considered as a vector of features or, more precisely, numbers quantifying these features. A statistical classifier computes the conditional probability of different classes for a given input pattern (hereinafter also referred to as "class membership probability"). The deviation of these class membership probabilities from 1 are often interpreted as a risk of a false classification.

A challenge in pattern classification is the reduction of misclassifications. As a first approach to this problem, it is known to provide the classifier with a "reject" option. A classifier may exercise the reject option whenever none of the conditional probabilities of the different classes for a given input pattern exceeds a required minimum threshold. Otherwise, the classifier assigns the input pattern to the class with the highest conditional probability. As a consequence, a test pattern close to a decision boarder implicitly defined by the classifier is prone to be rejected, while a test pattern far away from the boarder will be assigned to a class. For a detailed description of this technique, the interested reader is referred to the article "On Optimum Recognition Error and Reject Tradeoff" by C. K. Chow, IEEE Transactions on Information Theory, Vol. IT-16, No. 1, January 1970.

Another aspect of the misclassification problem is the estimation of the uncertainty of the class membership probability. A classifier is usually trained, during a training process, by means of training patterns. These training patterns are preferably chosen according to different types (classes) of situations the classifier shall be able to distinguish. The class membership probabilities of a test pattern to be classified are based upon the training patterns used in the training process. Ideally, one would prepare the classifier for all types of situations that can occur. In real-world applications, this is most often impossible to achieve, e.g. +because of "unforeseeable" situations or limited resources. As a result, the feature space, i.e. the space spanned by all possible patterns, is not homogeneously populated with training patterns. Intuitively, uncertainty of a class membership probability outputted by the classifier in response to a given test pattern will be small if the density of training patterns around the test pattern is high. Likewise, the uncertainty will be high if the density of training patterns around the test pattern is low. The idea behind this approach is explained in detail in U.S. Pat. No. 5,335,291 (Kramer et al.), which describes a neural network taking into account the local amount of training data in the vicinity of the test pattern to be classified for verifying that the classification is reliable. The goodness of the neural network output is expressed as a confidence interval.

A classifier that provides the certainty (or the uncertainty) of a class membership probability is attractive in a safety critical context, such as e.g. vehicle seat occupant classification, diagnosis classification, etc., since it allows labelling a test pattern as "unknown" and/or exercise the reject option if the uncertainty of the class membership probability is too high.

BRIEF DESCRIPTION OF THE INVENTION

The invention provides a method for pattern classification calculating a class membership probability in an improved way.

For assigning a test pattern to a class chosen from a predefined set of classes it is known to calculate the class membership probability for the test pattern and the confidence interval for the class membership probability based upon a number of training patterns in a neighbourhood of the test pattern in the feature space. According to an important aspect of the invention, the number of training patterns in the neighbourhood of the test pattern is obtained from computing a convolution of a density function of the training patterns with a Gaussian smoothing function centred on the test pattern, where the density function of the training patterns is represented as a mixture (superposition) of Gaussian functions. What is very interesting in this method is that it the number of training patterns in the neighbourhood is not obtained by actually counting the training patterns that lie within a certain distance from the test pattern. As a matter of fact, this would require a considerable amount of computational power and, furthermore, presuppose that the training patterns are all stored in a memory. For implementing the present method, the parameters that define the convolution of the density function of the training patterns with a Gaussian smoothing function are stored in memory. Depending on the amount of training patterns, these parameters may require only a small fraction of the memory space necessary for storing the corresponding set of training patterns.

Moreover, those skilled will highly appreciate that the convolution of the smoothing function and the mixture of Gaussian functions can be computed by using the analytical expression:

$$N_N(x) = \sum_{k=1}^{K} N'_k \exp\{-(x-\mu_k) S'^{-1}_k (x-\mu_k)/2\}, \qquad (1)$$

where x represents the test pattern, $N_N(x)$ the number of training patterns in the neighbourhood of x, K an integer, $\mu_k$ a vector in the feature space, $S'_k$ a matrix and $N'_k$ a real number.

In particular, K may represent the number of Gaussian functions in the mixture, $\mu_k$ the centre of the k-th Gaussian function, $S'_k$ a matrix and $N'_k$ a real number, $S'_k$ and $N'_k$ depending on the smoothing function and the k-th Gaussian function. Since this expression depends only on parameters $\mu_k$, $S'_k$ (or equivalently, $S'^{-1}_k$), $N'_k$ (k=1, ..., K) that can be calculated off-line during the training process, an implementation of the method requires only the knowledge of these parameters to calculate the number of training patterns in the vicinity of the test pattern. Consequently, the number of training patterns in the neighbourhood of the test pattern can be calculated simply by evaluating the above expression (1).

The above expression (1) may be better understood if one assumes that the density function of the training data is expressible as the mixture of Gaussian function in the following way:

$$\rho(x') = \sum_{k=1}^{K} \frac{N_k}{\sqrt{(2\pi)^d \det S_k}} \exp\{-(x'-\mu_k)S_k^{-1}(x'-\mu_k)/2\}, \quad (2)$$

where K represents the number of Gaussian functions in the mixture, x' a variable in the feature space, ρ(x') the density of training patterns at x', $\mu_k$ the centre of the k-th Gaussian function, $S_k$ a matrix describing the widths of the k-th Gaussian function, d the dimension of the feature space and where the $N_k$ represent normalisation factors fulfilling $$N_{tot} = \sum_{k=1}^{K} N_k, \quad (3)$$

where $N_{tot}$ is the total number of training patterns in the feature space. One preferably calculates the parameters $\mu_k$, $S_k$ (and $S_k^{-1}$) and $N_k$ offline, using e.g. the Expectation-Maximation algorithm. The latter is explained in "Unsupervised learning of finite mixture models", by M. Figueiredo et al. (IEEE Transactions on Pattern Analysis and Machine Intelligence, vol. 24, no. 3, pp. 1-16, March 2002).

To compute the number of training patterns in the neighbourhood of the test pattern, one would normally compute the integral of the training pattern density function over the neighbourhood:

$$N_N(x) = \int_{x' \in S(x,r)} \rho(x') dx', \quad (4)$$

where the neighbourhood is given here by a volume S(x,r) centred on x and with radius r. The inventors have proposed to replace the integration of density ρ(x') over the neighbourhood S(x,r) by the convolution of the density ρ(x') with the Gaussian smoothing function (also referred to as "kernel") that is centred on the test pattern:

$$N_N(x) = \int \rho(x') g(x', x, r) dx', \quad (5)$$

where the integration is performed over the entire feature space.

The smoothing function may be expressed as:

$$g(x', x, r) = \frac{1}{\sqrt{(2\pi r^2)^d \det C}} \exp\{-(x'-x)C^{-1}(x'-x)/(2r^2)\}, \quad (6)$$

where x represents the test pattern, x' a variable in the feature space, d the dimension of the feature space, C a symmetric matrix defining a metric on the feature space (such as, for instance, the covariance matrix of the training patterns) and r a radius of the neighbourhood with respect to this metric. With ρ(x') as defined in expression (2) and g(x',x,r) as defined in (6), expression (5) can be written as in expression (1), where the following notations apply:

$$N'_k = N_k \det(T_k S_k^{-1}),$$

$$S'^{-1}_k = S_k^{-1}(1 - T_k S_k^{-1}),$$

$$T_k = (C^{-1}/r^2 + S_k^{-1})^{-1}.$$

Once the number of training patterns $N_N$ in the neighbourhood of the test pattern has been calculated, the confidence interval can be calculated based upon the formula:

$$p_\pm = \frac{p_e + \lambda^2/(2N_N)}{1 + \lambda^2/N_N} \pm \frac{\sqrt{\lambda^2/N_N}\sqrt{p_e(1-p_e) + \lambda^2/(4N_N)}}{1 + \lambda^2/N_N}, \quad (7)$$

where $p_e$ represents the (estimate of the) class membership probability for the test pattern (as obtained by evaluating the class membership probability function for the test pattern), $p_+$ the upper boundary of the confidence interval and $p_-$ the lower boundary of the confidence interval and λ is representative of a predefined confidence level. The confidence level can be set according to the application. In the present context, the term "confidence interval" shall not be interpreted as limited to the interval $[p_-,p_+]$; rather it shall be interpreted as also encompassing the intervals $[0,p_+]$ and $[p_-,1]$. Therefore, providing at least one of $p_-$ and $p_+$ is regarded as providing a confidence interval in the sense of the present invention.

The larger the radius of the neighbourhood is chosen, the larger is the number of training patterns in the neighbourhood. Consequently, the confidence interval shrinks with increasing neighbourhood radius. On the other hand, equation (7) implicitly assumes that the estimated class membership probability $p_e$, is approximately the average of the class membership probability over the neighbourhood. This is true in the case that the radius of the neighbourhood is chosen small enough, such that variation of class membership probability is also small within the neighbourhood of the test pattern. A possible rule for choosing the radius of the neighbourhood is thus to define it at least approximately as half the minimum distance between the geometrical centres of the training patterns of the different classes. The radius of the neighbourhood could also be chosen as the minimum radius of the different classes. Thereby the involved radiuses and distances would be computed with respect to the metric given by the matrix C. As radius of a class one may, for instance, take the width of a Gaussian fit to the density of training patterns of that class.

According to a preferred embodiment of the invention, a plurality of class membership probabilities for the test patterns are calculated and the confidence interval is calculated for the highest one of the class membership probabilities. The test pattern may subsequently be assigned to the class for which the class membership probability is highest only if a lower boundary of the confidence interval exceeds a predefined threshold. In the opposite case, the test pattern may be classified as unknown or be assigned to another class. In case of a sequence of test patterns (e.g. in a seat occupancy classification system), if the classification of a given test pattern based upon the class membership probabilities is deemed unreliable then one could assign this pattern to the same class as the last preceding test pattern.

The above-described method may also be used for classifying test patterns of a sequence of test patterns. In this case, each test pattern of the sequence is assigned to a class chosen from the predefined set of classes and the class to which the respective pattern has been assigned is returned as a preliminary classification. For each test pattern, a quality factor associated to the respective preliminary classification is then determined based upon the confidence interval of the class membership probability or upon the number of training patterns in the neighbourhood of the test pattern considered. This quality factor is used to filter out those preliminary classifications that do not meat certain criteria with regard to the quality factor. The quality factor could, for instance, be the logarithm of the reciprocal width of the confidence interval or the number of training patterns, which is in the most straightforward embodiment compared to a threshold value. Alternatively, the quality factor could also be a derived according to another suitable rule. The filtering could e.g. be made by Kalman filtering technique, where the quality factor would be used for weighing the different preliminary classifications.

According to a most preferred embodiment of the invention the method is implemented in a vehicle seat occupant classification system and comprises providing sensor data relating to the occupant and using the sensor data as the test pattern to be assigned to a particular occupant class.

BRIEF DESCRIPTION OF THE DRAWINGS

Further details and advantages of the present invention will be apparent from the following detailed description of several not limiting embodiments with reference to the attached drawings, wherein.

DETAILED DESCRIPTION OF THE PREFERRED EMBODIMENTS

Figure 1:
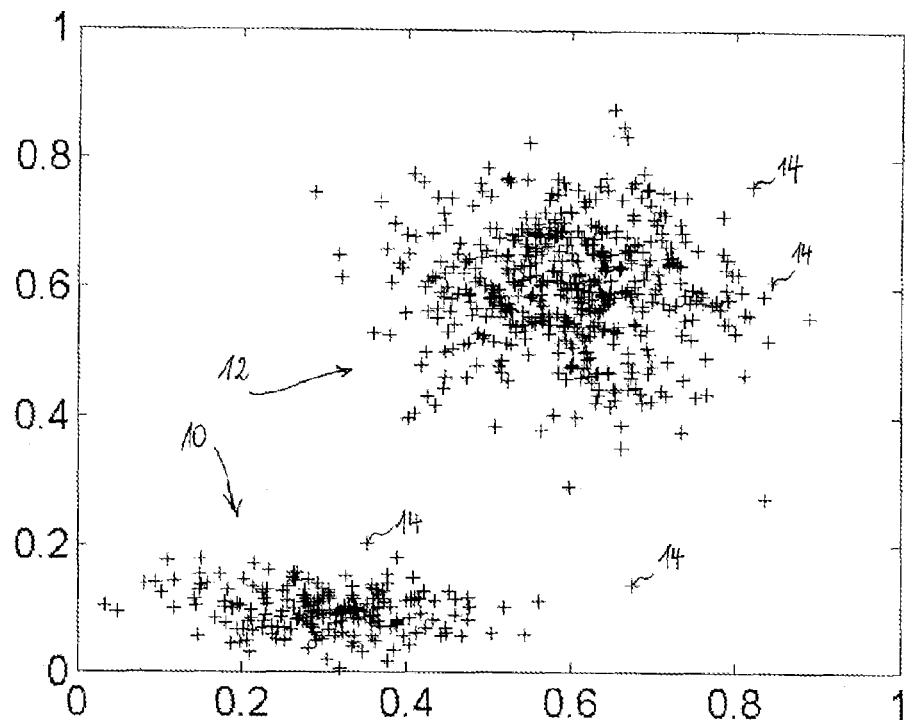
FIG. 1—an illustration of a 2D feature space with two clouds of data points representing training patterns belonging to two different classes.

FIG. 1 shows an example of a two-dimensional feature space with two clouds 10, 12 of data points 14 representing training patterns belonging to two different classes. In the case illustrated, the patterns of the feature space can be unambiguously expressed as array having as array elements the coordinates of the corresponding data points 14. Collection of training patterns can e.g. be achieved by exposing the sensor or sensors whose outputs are to be assigned to different classes to situations whose classification is known. In the present case, the representation of the collected patterns yields two clouds 10, 12 corresponding to a first class and a second class.

Figure 2:
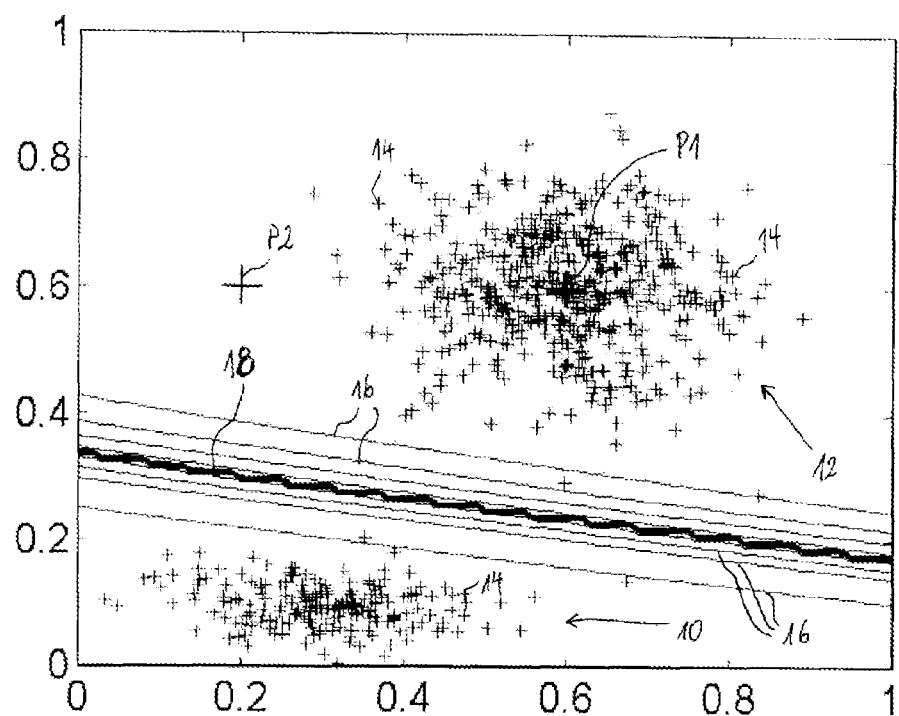
FIG. 2—shows the division of the feature space of FIG. 1 into two regions separated by a decision boarder.

Once the training patterns have been collected, the class membership probability functions are generated on the feature space. This can be done by various methods that are well documented in literature. FIG. 2 shows the separation of the feature space by a second order discriminant function that has been trained using the data shown in FIG. 1 following the method described by J. Schürmann in "Pattern Classification: Statistical and Neural Network based Approaches", John Wiley and Sons, New York (1990). Contour lines 16 indicate a decrease of the class membership probability functions from the clouds 10, 12 towards the decision boarder 18 as Chow has suggested it in the paper referenced above. At the decision boarder 18 itself the probability is 0.5 for either of the classes. The class membership probability functions do not account for the fact that there are regions in feature space where no training data were selected. Assume, for instance that we have two test patterns at points P1 and P2 with respective coordinates (0.6, 0.6) and (0.2, 0.6). These test patterns have approximately the same class membership probabilities. P1 is located within the cloud 12 of training patterns belonging to a common class, while P2 is located substantially outside any cloud of training patterns. Therefore, it is intuitively clear that the class membership probabilities of P2 suffer from higher uncertainty than those of P1.

The present method thus proposes to compute a confidence interval for a class membership probability of a given test pattern based upon the number of training patterns in the vicinity of the test pattern to be classified. The concept of a confidence interval for an estimated probability is well established for a so-called Bernoulli process, which follows statistically a Binomial distribution. The Binomial distribution gives the discrete probability distribution P(n|N) of obtaining exactly n successes out of N Bernoulli trials (where the result of each Bernoulli trial is true with probability p and false with probability q=1−p). The binomial distribution is given by, $$P(n \mid N) = \binom{N}{n} p^n q^{N-n}. \tag{8}$$

The expectation value of the Binomial distribution is $\mu_n = Np$, and the variance is $\sigma_n^2 = Npq$. In the limit $N \gg 1/(p(1-p))$, the Binomial distribution approaches a Gaussian distribution. The estimate $p_{estimate} = n/N$ of probability p drawn from N samples has a variance of $$\sigma_p^2 = \frac{p(1-p)}{N}. \tag{9}$$

The width of the confidence interval for the estimate $p_e$ of p is given by $$\Delta = \lambda \sqrt{\frac{p(1-p)}{N}}, \tag{10}$$

where λ is determined by the confidence level that has been chosen. The relationship between λ and the confidence level is given by the so-called erf-function, for evaluation of which look-up tables are normally used:

| λ | Confidence level |
|---|---|
| 1 | 0.682 |
| 2 | 0.95 |
| 3 | 0.997 |

More details on confidence intervals can for instance be found on the website http://mathworld.wolfram.com/Confidence-Interval.html.

Equation (10) is now used in the case of a statistical classifier: p is interpreted as the actual class membership probability and N as the number of samples in the neighbourhood of a test point (denoted $N_N$).

To get the boarders $p_-$ and $p_+$ of the confidence interval (1) one needs to solve the equation $$p_\pm \pm \lambda \sqrt{\frac{p_\pm (1 - p_\pm)}{N_N}} = p_e, \tag{11}$$

where $p_e$ is the estimate of the class membership probability, i.e. the value of the class membership probability function evaluated at a test pattern. The results is expression (7):

$$p_\pm = \frac{p_e + \lambda^2/(2N_N)}{1+\lambda^2/N_N} \pm \Delta(p_e) \quad (7')$$

where $$\Delta(p_e) = \frac{\sqrt{\lambda^2/N_N}\sqrt{p_e(1-p_e)+\lambda^2/(4N_N)}}{1+\lambda^2/N_N}. \quad (7'')$$

Figure 3:
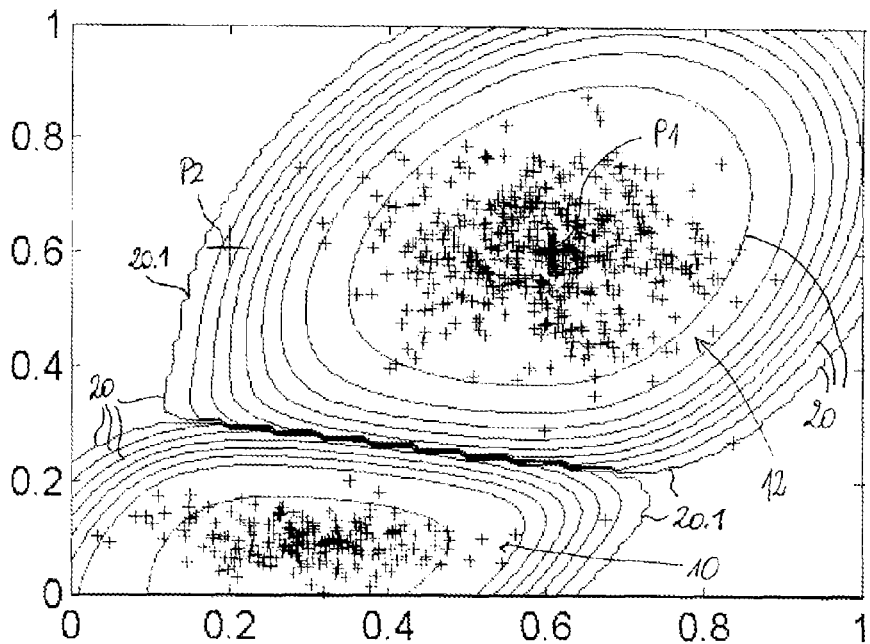
FIG. 3—shows the contour lines of the lower bound of the confidence interval of the class membership probabilities.

FIG. 3 shows the contour lines 20 of the lower bound ($p_-$) of the confidence interval of the estimated class membership probability. In this case, the density of training patterns has been approximated by two Gaussian functions, one for each cloud 10, 12. In regions with high training pattern density (e.g. around P1) the size of the confidence interval is very small, so that the resulting lower bound $p_-$ is almost equal to the estimated posterior probability $p_e$ itself. In regions a lower density of training patterns, e.g. around P2, the width of the confidence interval is increased and the lower bound of the confidence interval tends to zero. In FIG. 3, the regions outside the outer contour 20.1 correspond to a lower bound of the confidence interval below 0.1. If one requires that the lower bound of the confidence level is at least 0.1 for a test pattern being assigned to a class, test patterns in these regions can be detected as "unknown" and be rejected in order to avoid a false classification.

Figure 4:
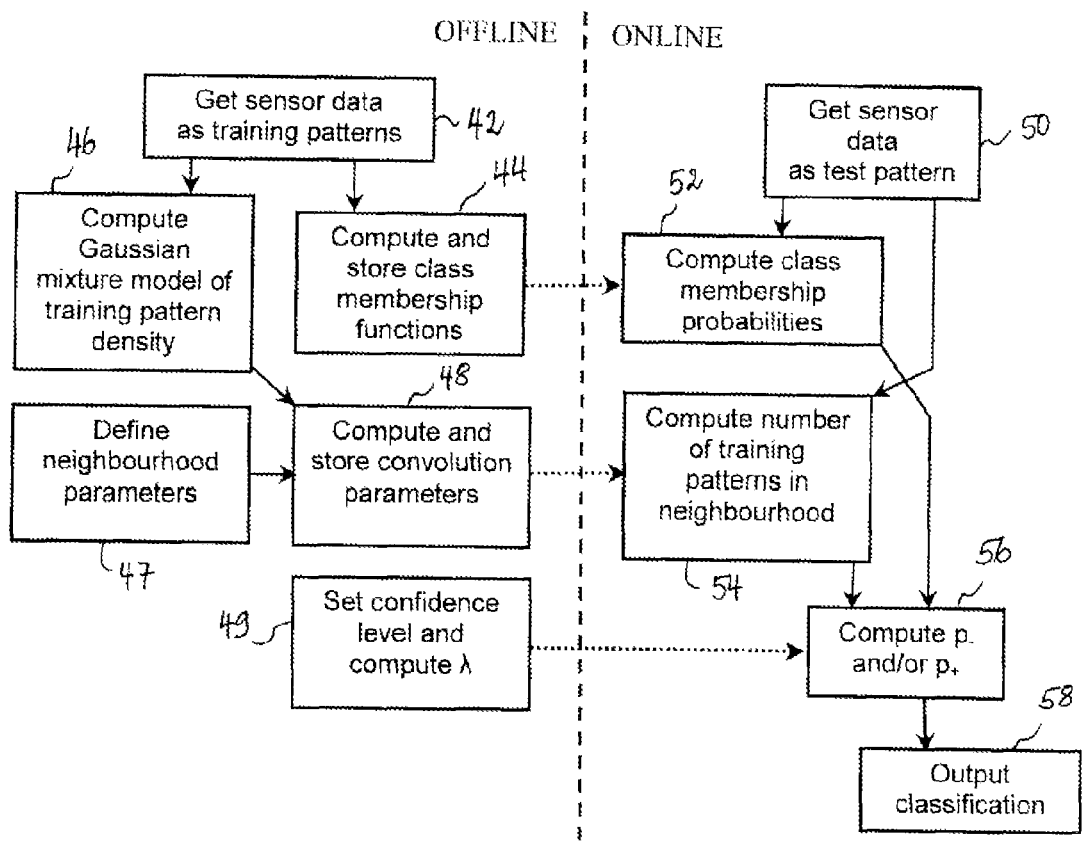
FIG. 4—a flow diagram of a preferred embodiment of the method according to the invention.

FIG. 4 shows a flow diagram of a preferred embodiment of the method for pattern classification. The method comprises a certain number of steps that are preferably executed offline and a certain number of steps that are performed online after a test pattern to be classified has been determined.

The offline steps are represented on the left side of the flow diagram. These steps essentially comprise the training of the classifier, the setting of parameters and the storage of those data that are necessary for the online steps in a memory. As an example, we assume that the test pattern to be classified will be provided in form of a sensor output of one or more sensors. For collecting the training patterns (step 42), one may expose the sensor or the sensors to situations that are expected to be encountered during the operation of the classification system and the sensor outputs are collected. Alternatively or additionally the training patterns could also be obtained from simulations of the sensor output.

After the training patterns have been recorded, the class membership functions are computed (step 44). These class membership functions later take a test pattern as input and output estimated probabilities of this test pattern belonging to the different classes. Additionally, the training patterns are used to generate the function that serves to compute the convolution of the training pattern density with a Gaussian smoothing function (steps 46, 47 and 48). In step 46 the density of training patterns is approximated with a Gaussian mixture model, i.e. a superposition of a finite number of Gaussian functions. Those parameters that determine the neighbourhood of a test pattern and that can be set or computed offline, e.g. the widths and/or the shape of the neighbourhood, are fixed in step 47. The convolution can be expressed as in equation (2) and the parameters determining this expression are stored for making them available when the number of training patterns in the neighbourhood of a test pattern is to be computed (step 48). It will be appreciated that the time-consuming computation of the Gaussian mixture model (step 46) and the class membership functions (step 44) does not need being repeated during the classification of a test pattern. It should be said for completeness, that the computation 48 of the class membership functions might also be based upon the Gaussian mixture model of the training pattern density.

The online steps of this embodiment of the method include first of all the acquisition 50 of a test pattern from the sensor or sensors. The class membership functions are retrieved from a memory and the different class membership probabilities of the test pattern are computed (step 52). In step 54, the parameters defining the equation (2) and thus the convolution to be computed are retrieved from a memory and the number of training data in the neighbourhood of the test pattern is determined.

Depending on the confidence level (set in offline step 49), the confidence intervals for the highest class membership probability found in 52 is calculated (step 56). The class the test pattern has been assigned to is output in step 58. In case the uncertainty of the class membership probability is deemed too high to name a class, the output may be "unknown".

Figure 5:
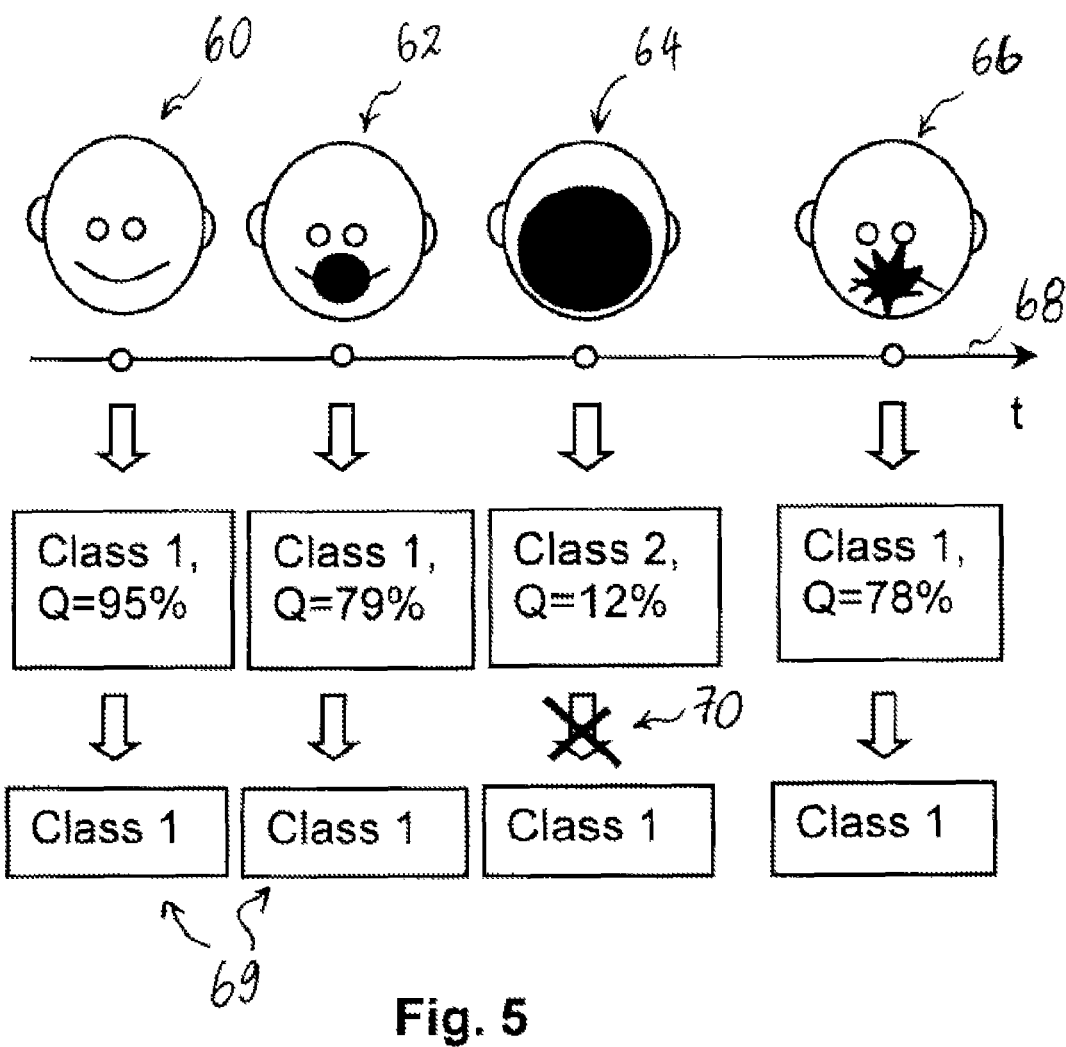
FIG. 5—an illustration of the classification of a sequence of test patterns.

FIG. 5 illustrates how the method can be used for classifying test patterns of a sequence of test patterns corresponding to real-life situations 60, 62, 64, 66. For sake of illustration, it is assumed that the classification system has been trained to distinguish a face (class 1 in the example) from an object (class 2), whereby features extracted from camera pictures are used as input data. Features indicative of a face may include mouth, eyes, ears, etc. Sketches of situations 60, 62, 64, 66 along time axis 68 represent a child making a bubble of chewing gum. For each test pattern the class membership probabilities are computed and the class with the highest probability is returned as preliminary classification. For each test pattern, a quality factor Q associated to the respective preliminary classification is determined based upon the confidence interval of the class membership probability or upon the number of training patterns in the neighbourhood of the test pattern considered. A quality factor close to 100% indicates, in the example, that the uncertainty of the preliminary classification is low and that the classification should be used as output 69. If the system encounters a situation that was not expected during training (situation 64), the preliminary classification may be wrong. But in the same time the low quality factor indicates that the preliminary classification is unreliable. In presence of the unknown situation 64, the system thus does not consider the preliminary classification as valid and discards it (shown at reference numeral 70). As output, the system uses in this case the last valid classification, which is in this case the classification of situation 62.

The invention claimed is:

1. A method of assigning a test pattern to a class chosen from a predefined set of classes, comprising:
    calculating a class membership probability for said test pattern; and
    calculating a confidence interval for said class membership probability based upon a number of training patterns in a neighbourhood of said test pattern in a feature space,
        wherein said number of training patterns in the neighbourhood of the test pattern is obtained from computing a convolution of a density function of said training patterns with a Gaussian smoothing function centred on said test pattern, said density function of the training patterns being represented as a mixture of Gaussian functions, and
    said convolution of the density function of the train patterns and said smoothing function is calculated by a function expressible as:

$$N_N(x) = \sum_{k=1}^{K} N'_k \exp\{-(x-\mu_k)S'^{-1}_k(x-\mu_k)/2\},$$

where x represents said test pattern, $N_N(x)$ the number of training patterns in a neighbourhood of x, K the number of Gaussian functions in said mixture, $\mu_k$, the centre of the k-th Gaussian function, $S'_k$ a matrix and $N'_k$ a real number, $S'_k$ and $N'_k$ depending on said smoothing function and the k-th Gaussian function.

2. The method according to claim 1, wherein said density function of training patterns is expressible as:

$$\rho(x') = \sum_{k=1}^{K} \frac{N_k}{\sqrt{(2\pi)^d \det S_k}} \exp\{-(x'-\mu_k)S_k^{-1}(x'-\mu_k)/2\},$$

where K represents the number of Gaussian functions in said mixture, x' a variable in said feature space, $\rho(x')$ the density of training patterns at x', $\mu_k$ the centre of the k-th Gaussian function, $S_k$ a matrix describing the widths of the k-th Gaussian function, d the dimension of said feature space and where the $N_k$ represent normalisation factors fulfilling $$N_{tot} = \sum_{k=1}^{K} N_k,$$

where $N_{tot}$ is the total number of training patterns in said feature space.

3. The method according to claim 2, wherein said smoothing function is expressible as:

$$g(x', x, r) = \frac{1}{\sqrt{(2\pi r^2)^d \det C}} \exp\{-(x'-x)C^{-1}(x'-x)/(2r^2)\},$$

where x represents said test pattern, x' a variable in said feature space, d the dimension of said feature space, C a symmetric matrix defining a metric on said feature space, and r a radius of said neighbourhood with respect to said metric.

4. The method according to claim 3, wherein $N'_k$ is given by $N'_k = N_k \det(T_k S_k^{-1})$, $S'_k$ is given by $S'^{-1}_k = S_k^{-1}(1-T_k S_k^{-1})$, and $T_k$ is defined as $T_k = (C^{-1}/r^2 + S_k^{-1})^{-1}$.

5. The method according to claim 3, wherein C is the covariance matrix of all training patterns.

6. The method according to claim 1, wherein said confidence interval is calculated based upon the formula:

$$p_\pm = \frac{p_e + \lambda^2/(2N_N)}{1 + \lambda^2/N_N} \pm \frac{\sqrt{\lambda^2/N_N} \sqrt{p_e(1-p_e) + \lambda^2/(4N_N)}}{1 + \lambda^2/N_N},$$

where $N_N$ represents said number of training patterns in the neighbourhood of the test pattern, $p_e$ said class membership probability for said test pattern, $p_+$ the upper boundary of said confidence interval and $p_-$ the lower boundary of said confidence interval and $\lambda$ is representative of a predefined confidence level.

7. The method according claim 1, wherein a plurality of class membership probabilities for said test pattern are calculated,
said confidence interval is calculated for a highest one of said class membership probabilities, and
said test pattern is assigned to the class for which the class membership probability is highest only if a lower boundary of said confidence interval exceeds a predefined threshold.

8. The method according to claim 7, wherein said test pattern is classified as unknown if a lower boundary of said confidence interval does not exceed a predefined threshold.

9. A method of classifying test patterns of a sequence of test patterns, comprising
assigning each test pattern of said sequence to a class chosen from a predefined set of classes according to the method as claimed in claim 1 and returning the class to which the respective pattern has been assigned as a preliminary classification;
determining for each test pattern of said sequence a quality factor associated to said preliminary classification based upon said confidence interval or upon said number of training patterns in the neighbourhood of the respective test pattern; and
filtering out preliminary classifications based upon an associated quality factor.

10. A method of classifying an occupant of a vehicle seat, comprising
providing sensor data relating to said occupant, and
using said sensor data as test pattern in a method according to claim 1.

11. A classification system for assigning a test pattern to a class chosen from a predefined set of classes, wherein said classification system:
calculates a class membership probability for said test pattern; and
calculates a confidence interval for said class membership probability based upon a number of training patterns in a neighbourhood of said test pattern in a feature space, said classification system obtaining said number of training patterns in the neighbourhood of the test pattern from computing a convolution of a density function of said training patterns with a Gaussian smoothing function centred on said test pattern, said density function of the training patterns being represented as a mixture of Gaussian functions,
wherein said classification system computes said convolution of the density function of the training patterns and said first smoothing function by a function expressible as:

$$N_N(x) = \sum_{k=1}^{K} N'_k \exp\{-(x-\mu_k)S'^{-1}_k(x-\mu_k)/2\},$$

where x represents said test pattern, $N_N(x)$ the number of training patterns in a neighbourhood of x, K the number of Gaussian functions in said mixture, w, the centre of the k-th Gaussian function $S'_k$ a matrix and $N'_k$ a real number $S'_k$ and $N'_k$ depending on said smoothing function and the k-th Gaussian function.

12. A method of assigning a test pattern to a class chosen from a predefined set of classes, comprising:

calculating a class membership probability for said test pattern; and calculating a confidence interval for said class membership probability based upon a number of training patterns in a neighbourhood of said test pattern in a feature space, wherein said number of training patterns in the neighbourhood of the test pattern is obtained from computing a convolution of a density function of said training patterns with a Gaussian smoothing function centred on said test pattern, said density function of the training patterns being represented as a mixture of Gaussian functions, and said confidence interval is calculated based upon the formula:

$$p_{\pm} = \frac{p_e + \lambda^2/(2N_N)}{1 + \lambda^2/N_N} \pm \frac{\sqrt{\lambda^2/N_N}\sqrt{p_e(1-p_e) + \lambda^2/(4N_N)}}{1 + \lambda^2/N_N},$$

where $N_N$ represents said number of training patterns in the neighbourhood of the test pattern, $p_e$ said class membership probability for said test pattern, $p_+$ the upper boundary of said confidence interval and $p_-$ the lower boundary of said confidence interval and $\lambda$ is representative of a predefined confidence level.

* * * * *